United States Patent
Miyamoto et al.

[11] Patent Number: 6,166,167
[45] Date of Patent: Dec. 26, 2000

[54] POLYCARBONATE RESIN FOR SUBSTRATE OF OPTICAL RECORDING MEDIUM

[75] Inventors: Masaaki Miyamoto, Fukuoka; Motonori Ueda, Okayama, both of Japan

[73] Assignee: Mitsubishi Chemical Corporation, Tokyo, Japan

[21] Appl. No.: 09/124,185

[22] Filed: Jul. 28, 1998

[30] Foreign Application Priority Data

Jul. 29, 1997 [JP] Japan .................. 9-202948

[51] Int. Cl.$^7$ .................................. C08G 64/00
[52] U.S. Cl. .................................. 528/196; 528/198
[58] Field of Search ....................... 528/196, 198

[56] References Cited

U.S. PATENT DOCUMENTS

| | | | |
|---|---|---|---|
| 4,880,896 | 11/1989 | Otsubo et al. | 528/196 |
| 4,959,456 | 9/1990 | Ashida et al. | 528/196 |

FOREIGN PATENT DOCUMENTS

| | | |
|---|---|---|
| 0 293 769 | 12/1988 | European Pat. Off. . |
| 0 369 422 | 5/1990 | European Pat. Off. . |
| 0 600 447 | 6/1994 | European Pat. Off. . |
| 0 846 713 | 6/1998 | European Pat. Off. . |
| 2 605 134 | 4/1988 | France . |
| 63-278929 | 11/1988 | Japan . |
| 64-6020 | 1/1989 | Japan . |
| 6-23243 | 3/1994 | Japan . |
| 9-48844 | 2/1997 | Japan . |

Primary Examiner—Terressa M. Boykin
Attorney, Agent, or Firm—Oblon, Spivak, McClelland, Maier & Neustadt, P.C.

[57] ABSTRACT

A polycarbonate resin obtained by polymerizing an aromatic diol and a carbonate-forming compound using a monophenolic compound as a molecular weight modifier, wherein said polycarbonate resin contains from 0.2 to 2% by weight of a low-molecular weight compound represented by formula (I):

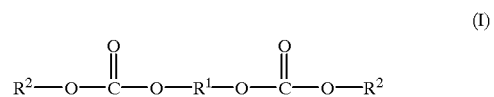

wherein $R^1$ represents an aromatic diol residue; and $R^2$ represents a monophenolic compound residue, and wherein said polycarbonate resin provides less amount of low-molecular weight volatile matters even when heated or injection-molded. When heated at 350° C. under reduced pressure of 1 mmHg for 20 minutes, the proportion of the low-molecular weight compound of formula (I) which volatilizes is not more than 0.2% by weight based on the weight of said low-molecular weight compound of formula (I) present in the polycarbonate resin. When heated at 400° C. under reduced pressure of 1 mmHg for 30 minutes, the proportion of the low-molecular weight compound of formula (I) which volatilizes is not more than 2% by weight based on the low-molecular weight compound of formula (I) present in the polycarbonate resin.

20 Claims, No Drawings

POLYCARBONATE RESIN FOR SUBSTRATE OF OPTICAL RECORDING MEDIUM

FIELD OF THE INVENTION

This invention relates to a polycarbonate resin, particularly a polycarbonate resin suitable for use as a substrate of optical recording media, such as optical discs. The present invention further relates to a substrate of optical recording media prepared from the polycarbonate resin and to an optical recording medium containing the substrate.

BACKGROUND OF THE INVENTION

Compared with conventional magnetic recording systems, a non-contact optical recording system capable of recording and reproduction is characterized by resistance to scratches and stains and has been making a great contribution to large memory.

A recording medium of this system is composed of a transparent substrate made of, e.g., a polycarbonate resin, having a recording layer formed thereon. A polycarbonate resin is suitable as a material of the substrate for its high resistance to heat of melt molding, small dimensional change after molding, and excellent mechanical characteristics. Substrates for optical recording media should of necessity possess the characteristics required of a substrate, such as birefringence and mechanical characteristics, and are also required to be free from molding defects, such as pit deviations and mold release unevenness, which may be developed in the production of substrates. In the production of the substrate, a polycarbonate resin is usually molded in a higher temperature than for other purposes because a transparent substrate should be free of residual birefringence. Low-molecular weight volatile matter generated during the high temperature molding is apt to adhere to the stamper or the replica, causing a serious problem of servo control errors. How to reduce the volatile content has therefore been a big problem awaiting for a solution.

Of literature on polycarbonate resins suited for this use, there are many reports on low-molecular weight substances contained therein. For example, methods for diminishing low-molecular weight compounds by adding improvements to the polymerization technique are disclosed in JP-B-6-23243 (the term "JP-B" as used herein means an "examined Japanese patent publication"), JP-A-6-336522 (the term "JP-A" as used herein means an "unexamined published Japanese patent application"), and JP-A-3-109420. With regard to removal of low-molecular weight compounds from a produced polymer, JP-A-63-278929, JP-A-64-6020, and JP-A-4-306227 teach acetone extraction.

Existing literature, inclusive of the above, relates to how to reduce the low-molecular weight compound content of polycarbonate resins, with no considerations given to what kind of and how low-molecular weight compounds volatilize. Obviously, there is room for due consideration as regards these points. In particular, the means proposed for reduction of low-molecular weight components, such as acetone extraction, achieve relatively satisfactory effects but, in turn, necessitates a complicated step therefor (such as acetone extraction), which creates another issue in industrial production. For example, adoption of acetone extraction involves subsidiary steps for acetone separation and recovery as well as the step of acetone extraction itself, making the whole process considerably complicated.

SUMMARY OF THE INVENTION

An object of the present invention is to provide a polycarbonate resin suitable for use as a substrate of optical recording media, such as optical discs.

Another object of the present invention is to provide a substrate of optical recording media prepared from the polycarbonate resin.

A further other object of the present invention is to provide an optical recording medium containing the substrate.

The inventors of the present invention extensively studied on polycarbonate resins suitable as a substrate of optical recording media. As a result, they have found that the existence of a specific low-molecular weight compound in a polycarbonate resin is influential and that the state of its existence, rather than the existence itself, is the key to the outstanding problem. More specifically, it has been found important to improve solubility or compatibility of the specific low-molecular weight compound in or with a molten polycarbonate resin and to suppress decomposition of the compound in the polycarbonate resin, i.e., to obtain a thermally stable polycarbonate resin. That is, notwithstanding the existence of a certain amount of the low-molecular weight compound, the proportion of the volatilizable portion of the compound can be reduced by making the compound by-produced in the production of a polycarbonate resin thermally stable. The present invention has been completed based on this finding.

The present invention relates, in a first aspect, to a polycarbonate resin obtained by polymerizing an aromatic diol and a carbonate-forming compound using a monophenolic compound as a molecular weight modifier, wherein the polycarbonate resin contains from 0.2 to 2% by weight of a low-molecular weight compound represented by formula (I):

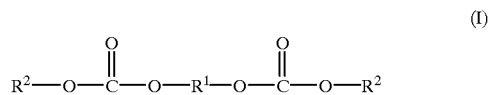

wherein $R^1$ represents an aromatic diol residue; and $R^2$ represents a monophenolic compound residue, and when the polycarbonate resin is heated at 350° C. under reduced pressure of 1 mmHg for 20 minutes, the proportion of the low-molecular weight compound of formula (I) which volatilizes is not more than 0.2% by weight based on the weight of said low-molecular weight compound of formula (I) present in the polycarbonate resin.

The present invention relates, in a second aspect, to a polycarbonate resin obtained by polymerizing an aromatic diol and a carbonate-forming compound using a monophenolic compound as a molecular weight modifier, wherein the polycarbonate resin contains from 0.2 to 2% by weight of a low-molecular weight compound represented by formula (I) and, when the polycarbonate resin is heated at 400° C. under reduced pressure of 1 mmHg for 30 minutes, the proportion of the low-molecular weight compound of formula (I) which volatilizes is not more than 2% by weight based on the weight of said low-molecular weight compound of formula (I) present in the polycarbonate resin.

The present invention relates, in a third aspect, to a polycarbonate resin obtained by polymerizing an aromatic diol and a carbonate-forming compound using a monophenolic compound as a molecular weight modifier, wherein the polycarbonate resin contains from 0.2 to 2% by weight of a low-molecular weight compound represented by formula (I), and after 5000 injection shots of the polycarbonate resin each weighing 10 g are made into discs at a cylinder temperature of 350° C., the amount of the low-molecular weight compound of formula (I) adhered to the stamper is not more than 1 ppb based on the total weight of the injected resin.

The present invention relates, in a fourth aspect, to a polycarbonate resin obtained by polymerizing an aromatic diol and a carbonate-forming compound using a monophenolic compound as a molecular weight modifier, wherein the polycarbonate resin contains from 0.2 to 2% by weight of a low-molecular weight compound represented by formula (I), and after 5000 injection shots of the polycarbonate resin each weighing 10 g are made into discs at a cylinder temperature of 380° C., the amount of the low-molecular weight compound of formula (I) adhered to the stamper is not more than 4 ppb based on the total weight of the injected resin.

The present invention further relates to a substrate for an optical recording medium which comprises the above-described polycarbonate resin and to an optical recording medium comprising the substrate having provided thereon an optical recording layer.

The technical gist of the present invention resides in that the proportion of the volatilizable part of the low-molecular weight compound represented by formula (I) is regulated to a specific proportion or less. Conventional arguments have been confined to the absolute quantity of general low-molecular weight substances with no recognition of the presence of the specific low-molecular weight compound of formula (I), still less the importance of the proportion of the volatilizable part of it. For example, when low-molecular weight components are removed by acetone extraction, the absolute amount of the low-molecular weight compound of formula (I) decreases, but the proportion of the volatilizable part of it does not change.

Reviewing the problem from this standpoint, while it is of necessity true that the absolute amount of the low-molecular weight compound concerns volatilization of the low-molecular weight compound, what is more surprising, it has turned out that whether the low-molecular weight compound volatilizes or not is governed by the solubility (or compatibility) of the low-molecular weight compound in (or with) a molten polycarbonate resin and the decomposability of the low-molecular weight compound (i.e., thermal stability of the polycarbonate resin).

Thus, the present invention is based on the finding that despite the existence of a certain amount of the low-molecular weight compound, which is by-produced in the production of a polycarbonate resin, in the produced polycarbonate resin, the proportion of a volatilizable part of the low-molecular weight compound can be reduced by rendering the low-molecular weight compound thermally stable.

DETAILED DESCRIPTION OF THE INVENTION

The compound represented by formula (I) is defined as a by-product resulting from reaction of the terminal hydroxyl groups of an aromatic diol with a monophenolic compound via a carbonate-forming compound. For example, where bisphenol A as an aromatic diol and phosgene as a carbonate-forming compound are reacted in the presence of p-t-butylphenol as a monophenolic compound, the by-produced low-molecular weight compound of formula (I) is represented by formula (II):

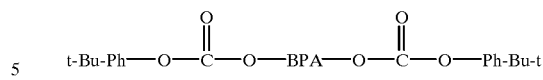

wherein t-Bu represents a tertiary butyl group; —Ph— represents a phenylene group; and O—BPA—O represents a bisphenol A residual group; the compound of formula (II) will hereinafter be abbreviated as PBP.

It is essential that the content of the low-molecular weight compound (I) in a polycarbonate resin should be 0.2 to 2% by weight, preferably 0.3 to 2% by weight, still preferably 0.3 to 0.7% by weight, particularly preferably 0.3 to 0.5% by weight. If the content of the low-molecular weight compound (I) is higher than 2% by weight, the polycarbonate resin fail to exhibit characteristics necessary for the use as a substrate of optical recording media. In order to lower the low-molecular weight compound (I) content than 0.2% by weight, a special operation such as acetone extraction would be required after production of a polycarbonate resin. In other words, such a special operation that has been usually needed for decreasing the amount of the low-molecular weight compound (I) is not required in the present invention.

What is essential for the polycarbonate resin according to the first aspect of the present invention is that, when the polycarbonate resin is heated at 350° C. under reduced pressure of 1 mmHg for 20 minutes (hereinafter referred to as condition A), the proportion of the part of the low-molecular weight compound (I) that is released from the polycarbonate resin as vapor should be not more than 0.2% by weight based on the initial content of the low-molecular weight compound (I). That proportion is preferably not more than 0.15% by weight, still preferably not more than 0.1% by weight. Thus, the importance lies in not only the content of the low-molecular weight compound (I) but the proportion of a volatilizable part of the compound (I). If the proportion of a volatilizable part of the compound (I) exceeds 0.2% by weight, the characteristics required as a substrate of optical recording media are not obtained. The conventional methods relying on acetone extraction and the like achieve reduction of general low-molecular weight compounds but produce no effects on the proportion of a volatilizable part of the existing low-molecular weight compounds.

The amount of vapor released from a polycarbonate resin will be reduced (i.e., the ratio of the volatilizable part to the total content before heating will be reduced) at a lower testing temperature or in a shorter testing period in a volatility test. Therefore, strict reproduction of the testing conditions is an important factor in evaluation.

What is required for the polycarbonate resin according to the second aspect of the present invention is that, when the polycarbonate resin is heated at 400° C. under reduced pressure of 1 mmHg for 30 minutes (hereinafter referred to as condition B), the proportion of the part of the low-molecular weight compound (I) that is released from the polycarbonate resin as vapor should be not more than 2% by weight based on the total content of the low-molecular weight compound (I). That proportion is preferably not more than 1.5% by weight, still preferably not more than 1.0% by weight, based on the total content of the compound (I). Thus, the importance lies in not only the content of the low-molecular weight compound (I) but the proportion of a volatilizable part of the compound (I). If the proportion of a volatilizable part of the compound (I) exceeds 2% by weight, the characteristics required as a substrate of optical recording media are not obtained. The conventional methods relying on acetone extraction and the like achieve reduction of general low-molecular weight compounds but produce no effects on the proportion of a volatilizable part of the existing low-molecular weight compounds.

What is required for the polycarbonate resin according to the third or fourth aspect of the present invention is that, after 5000 injection shots of the polycarbonate resin each weighing 10 g are made into discs at a cylinder temperature of 350° C. or 380° C., the amount of the low-molecular weight compound (I) adhered to the stamper is not more than 1 ppb or not more than 4 ppb, respectively, based on the total amount of the injected resin. Polycarbonate resins out of this specification are unsuitable as a substrate for optical recording media.

The aromatic diols which can be used as a starting material of the polycarbonate resin are represented by formula: HO—Z—OH, wherein Z represents at least one aromatic nucleus in which the hydrogen atom or atoms bonded to the nucleus-forming carbon atom(s) may be substituted with a halogen atom (e.g., chlorine, bromine), an aliphatic group, an alicyclic group, etc. The substituents on the two or more aromatic nuclei, if any, may be the same or different. The two or more aromatic nuclei may be linked to each other via a crosslinking group. The crosslinking group includes an aliphatic group, an alicyclic group, a hetero atom, and combinations thereof.

Suitable aromatic diols include hydroquinone, resorcin, biphenol, bis(hydroxyphenyl)alkanes, bis(hydroxyphenyl) cycloalkanes, bis(hydroxyphenyl) sulfide, bis (hydroxyphenyl) ether, bis(hydroxyphenyl) ketone, bis (hydroxyphenyl)sulfone, bis(hydroxyphenyl) sulfoxide, bis (hydroxyphenyl)dialkylbenzenes, and their derivatives having an alkyl or halogen substituent on the nucleus. Two or more of these aromatic diols can be used in combination.

Specific examples of the above-enumerated aromatic diols and other suitable aromatic diols are given in U.S. Pat. Nos. 4,982,014, 3,028,365, 2,999,835, 3,148,172, 3,275, 601, 2,991,273, 3,271,367, 3,062,781, 2,970,131 and 2,999, 846, German Patent OLS Nos. 1,570,703, 2,063,050, 2,063, 052 and 2,211,956, and French Patent 1,561,518.

Particularly preferred aromatic diols include 2,2-bis(4-hydroxyphenyl)propane (bisphenol A), 2,2-bis(3,5-dimethyl-4-hydroxyphenyl)propane, 1,1-bis(4-hydroxyphenyl)cyclohexane (bisphenol Z), and 1,1-bis(4-hydroxyphenyl)-3,3,5-trimethylcyclohexane.

The carbonate-forming compounds which can be used as another starting material of the polycarbonate resin are not particularly limited as long as they react with an aromatic diol to form a carbonate bond. Usable carbonate-forming compounds include phosgene, dimethyl carbonate, and diphenyl carbonate, with diphenyl carbonate and phosgene being preferred. It is particularly preferred to use phosgene as a starting material. The language "to use phosgene as a starting material" as noted above means not only to use phosgene as a reactant with which an aromatic diol is reacted directly but to use phosgene as a starting material from which an intermediate compound, such as diphenyl carbonate, is prepared as a reactant.

The inventors have extensively studied on the volatility of low-molecular weight compounds in a polycarbonate resin as a final product. As a result, they have found, to their surprise, that there is a correlation between the volatility and chlorine present in starting phosgene as impurity. In some detail, the impurity chlorine in phosgene acts to chlorinate a specific site of the aromatic diol in some way in the initial stage of polycarbonate production in which an aqueous solution of an alkali metal salt of the aromatic diol and phosgene are reacted. The chlorinated aromatic diol has such a character that it remains unchanged until the final stage, and afterward, when exposed to severer conditions than usual during molding, undergoes gradual decomposition.

The inventors have ascertained that the heat stability of a produced polycarbonate resin in its molten state during molding increases to suppress volatilization of low-molecular weight oligomers according as the impurity chlorine content in phosgene is diminished to a possible minimum. For example, a polycarbonate resin obtained by using phosgene which has been once liquefied for the purpose of purification and passed through a column packed with activated carbon to remove chlorine and a polycarbonate resin obtained by using phosgene which has not been treated with activated carbon have the same low-molecular weight compound content but differ in heat stability of the low-molecular weight compound. That is, the low-molecular weight compound in the former resin is less volatilizable when molded in high temperatures.

Much study has been conventionally given to the impurities in phosgene which is used as a reactant to be reacted with an aqueous solution of an aromatic diol alkali metal salt in the presence of an organic solvent for the production of polycarbonate (interfacial condensation process) or which is used as a starting material of a diaryl carbonate to be reacted with an aromatic diol for the production of polycarbonate in the absence of an organic solvent (melt process). Reduction of the chlorine content present in phosgene on the order of several hundreds of ppm to the order of several tends of ppm has been reported, and it has also been pointed out that reduction of the chlorine content of phosgene is favorable to polycarbonate resins.

For example, U.S. Pat. Nos. 3,230,253 and 3,331,873 teach that chlorine which is present as impurity in phosgene on the order of several hundreds of ppm can be reduced to the order of several tens of ppm by adsorption to phenol compounds or activated carbon. However, the patents made the proposal merely as a technique for reducing the chlorine content without demonstrating use of the thus purified phosgene in the production of polycarbonate.

JP-A-62-297320 and JP-A-62-297321 have their focus on carbon tetrachloride as an impurity of phosgene, which has a higher boiling point than phosgene and generates hydrochloric acid when heated on molding, proposing reducing the content of carbon tetrachloride in phosgene to a certain level or lower.

Phosgene is generally produced from CO and $Cl_2$ in the presence of activated carbon as a catalyst. Since the reaction reaches equilibrium in the final stage, shifting the $CO/Cl_2$ ratio to CO excess is a conceivable means for reducing the chlorine content in phosgene produced. However, to use CO in large excess leads to a loss of CO gas and also involves discharge of a considerable amount of phosgene accompanying CO gas, resulting in an extreme reduction of the unit. Therefore, most of the current phosgene plants are operated while bringing down the degree of CO excess to an absolute minimum consistent with a minimum phosgene loss. Under this situation and due to the limited detection means and the limited detection precision, existence of a trace amount of $Cl_2$ has been ignored.

Where phosgene is used as a starting material in the present invention, it is preferable to use phosgene having a chlorine content of not more than 1500 ppb, preferably not more than 1000 ppb, still preferably not more than 500 ppb, particularly preferably not more than 100 ppb. Starting with phosgene whose chlorine content is sufficiently reduced to the above level, the resulting polycarbonate resin exhibits excellent characteristics with improved heat stability while molded in a molten state and is therefore preferred as a substrate of an optical recording medium. For example, compared with a polycarbonate resin produced by using phosgene not having its chlorine content reduced, a polycarbonate resin produced by using phosgene which is prepared by treating liquefied phosgene with activated carbon to have its chlorine content sufficiently reduced is remarkably superiority in behavior in a volatility test or anti-adhesion to a stamper in injection molding, while equal in the content of the low-molecular weight compound (I).

Conceivable origins of chlorine that may be incorporated into a polycarbonate resin during production by, for example, an interfacial condensation process or a melt process include not only the starting phosgene but a reaction solvent used, such as methylene chloride, hydrochloric acid used for cleaning, and like chlorine-containing substances. According to the inventors' findings, however, the chlorine originated in phosgene is overwhelmingly influential on the amount of the low-molecular weight compound released from the resulting polycarbonate resin as vapor or the amount of the low-molecular weight compound adhered to a stamper, which is a wholly surprising fact.

Where phosgene is used as a starting material, it is used as liquid or gas. From the standpoint of temperature control, liquid phosgene is preferred. Liquid phosgene is particularly advantageous for the impurity chlorine of phosgene to be removed by adsorption as hereinafter described.

The means for reducing the chlorine content of phosgene to the above-specified preferred range are not particularly restricted. For example, a special process providing chlorine-free phosgene can be adopted, or phosgene prepared by a common process, which contains a large amount of impurity chlorine, can be purified to remove the chlorine. The latter means is preferred for production on an industrial scale. Removal of chlorine from phosgene can be carried out by any of known methods, such as adsorption on an adsorbent, such as activated carbon, and distillation taking advantage of a boiling point difference. Removal by adsorption is more advantageous because the order of chlorine removal by distillation is so low that a considerable number of plates would be needed to achieve satisfactory chlorine reduction.

Adsorbents that can be used for removing chlorine from phosgene include activated carbon and various others such as phenolic compounds.

While various species of activated carbon designed for acidic gas, basic gas, general gas, etc. are employable, those for acidic gas are suited for their chlorine adsorptivity. Preferred species of activated carbon are those having the following characteristics.

Particle size: 2 to 60 mesh, particularly 30 to 60 mesh.

True density: 1.9 to 2.2 g/cc, particularly 2.0 to 2.1 g/cc.

Porosity: 33 to 75%, particularly 45 to 75%.

Specific surface area: 700 to 1500 $m^2/g$, particularly 900 to 1300 $m^2/g$.

Total pore volume: 0.5 to 1.4 cc/g, particularly 0.7 to 1.4 cc/g.

Average pore size: 1 to 40 Å, particularly 15 to 40 Å.

Treatment of liquid phosgene with activated carbon is usually carried out at a space velocity of about 2 to 10, preferably about 2 to 5, still preferably about 2 to 4. At too high a space velocity, the adsorbed chlorine tends to leak slightly from the outlet of the column of activated carbon. The temperature of the liquid phosgene to be treated is usually about 0 to 5° C., at which an adsorption of about 120 g-Cl/kg-activated carbon can be maintained.

Use of a monophenolic compound as a molecular weight modifier (chain terminator) is essential in the production of the polycarbonate resin according to the present invention. Monophenolic compounds structurally similar to the aforesaid aromatic diols except for the number of phenolic hydroxyl groups can be used. Note that the amount of the low-molecular weight compound by-produced is somewhat subject to variation depending on the kind of the monophenolic compound used.

Suitable monophenolic compounds include not only unsubstituted phenol but alkylphenols having 1 to 10 carbon atoms, such as p-t-butylphenol and p-cresol, and halogenated phenols, such as p-chlorophenol and 2,4,6-tribromophenol. Preferred of them are phenol and alkylphenols, such as isopropylphenol, isooctylphenol, and p-t-butylphenol. While varying according to the desired molecular weight of a polycarbonate resin to be produced, the monophenolic compound is usually used in an amount of 0.5 to 10% by weight based on the aromatic diol.

The performance characteristics of the resulting polycarbonate resin as a substrate of an optical recording medium are also subject to variation depending on the time of addition of the monophenolic compound to the reaction system. For example, when it is added in the presence of a carbonate-forming compound, cases are sometimes met with in which a condensation product among the molecules of the monophenolic compound (i.e., diphenyl carbonate) is by-produced in a considerable amount. Extreme retardation of the addition of the monophenolic compound is impractical, making molecular weight control difficult. Eventually, it may be seen preferable that the monophenolic compound be added during the period of from immediately after consumption of a carbonate-forming compound and by the time when chain extension begins.

An arbitrary branching agent also serves as a starting material of the polycarbonate resin. Useful branching agents can be chosen from various compounds having three or more functional groups, for example, phenolic hydroxyl groups, such as 2,4-bis(4-hydroxyphenylisopropyl)phenol, 2,6-bis(2-hydroxy-5-methylbenzyl)-4-methylphenol, 2-(4-hydroxyphenyl)-2-(2,4-dihydroxyphenyl)propane, and 1,4-bis(4,4'-dihydroxytriphenylmethyl)benzene. Additionally, 2,4-dihydroxybenzoic acid, trimesic acid, and cyanuric chloride, which are trifunctional compounds, are also useful. Inter alia, compounds having three or more phenolic hydroxyl groups are preferred. These branching agents can be used in an amount of 0.05 to 2 mol % based on the aromatic diol, while varying according to the desired degree of branching.

The polycarbonate resin of the present invention is usually produced by (1) a process comprising reacting phosgene and an aromatic diol under conditions for interfacial polycondensation or for solution polymerization or (2) a process comprising preparing diphenyl carbonate by, for example, reacting phosgene and phenol and reacting the diphenyl carbonate with an aromatic diol under conditions for melt condensation.

The process (2) is typically carried out by reacting purified diphenyl carbonate and an aromatic diol under melting conditions (at or below 300° C.) and under high vacuum conditions ($\leq 50$ mmHg) to cause chain extension through ester exchange while evaporating phenol. In this reaction a polycondensation catalyst of various types is used. The evaporated phenol is usually recovered for reuse.

The process (1) is typically conducted by reacting an aqueous solution of a metal salt of an aromatic diol with phosgene in the presence of an organic solvent to obtain a carbonate oligomer. Being the most prevalent in the art, the process (1) will be described in detail.

In the above reaction system, the aromatic diol forms an aqueous phase together with water and a water-soluble metal hydroxide. The metal hydroxide usually employed includes alkali metal hydroxides, such as sodium hydroxide and potassium hydroxide. The aromatic diol and the metal hydroxide react in the aqueous phase to form a water-soluble metal salt. The molar ratio of the aromatic diol to the alkali metal hydroxide in the aqueous phase is preferably 1:1.8 to 1:3.5, still preferably 1:2.0 to 1:3.2. To the aqueous phase may be added a small amount of a reducing agent, such as hydrosulfite.

The organic solvent which can be used in the reaction is an arbitrary inert organic solvent which is capable of dissolving phosgene and reaction products, such as carbonate oligomers and polycarbonate, but incapable of dissolving water, that is, incapable of forming a solution with water. Typical examples of such inert organic solvents include aliphatic hydrocarbons, such as hexane and n-heptane; chlorinated aliphatic hydrocarbons, such as methylene chloride, chloroform, carbon tetrachloride, dichloroethane, trichloroethane, tetrachloroethane, dichloropropane, and 1,2 -dichloroethylene; aromatic hydrocarbons, such as benzene, toluene, and xylene; chlorinated aromatic hydrocarbons, such as chlorobenzene, o-dichlorobenzene, and chlorotoluene; and other substituted aromatic hydrocarbons, such as nitrobenzene and acetophenone. Of these solvents preferred are chlorinated hydrocarbons, such as methylene chloride and chlorobenzene. These inert organic solvents can be used either individually or as a mixture thereof.

Phosgene is usually used in an amount of 1.0 to 2.0 mol, preferably 1.0 to 1.5 mol, still preferably 1.0 to 1.2 mol, particularly preferably 1.05 to 1.15 mol, per mole of the aromatic diol, while varying according to the reaction conditions, particularly the reaction temperature and the concentration of the aromatic diol in the aqueous phase. If the molar ratio of phosgene to the diol is too high, a considerable loss of phosgene can result. If it is too small, the CO group content is insufficient for satisfactory chain extension.

The condensation catalyst can be supplied before contact with phosgene, which is preferred, or, if desired, at the time of contact with phosgene. The condensation catalyst is selected arbitrarily from among many catalysts for polycondensation generally used in the interfacial condensation process. In particular, trialkylamines, N-ethylpyrrolidone, N-ethylpiperidine, N-ethylmorpholine, N-isopropylpiperidine, and N-isopropylmorpholine are suitable, with triethylamine and N-ethylpiperidine being especially preferred.

As previously elaborated, in order to minimize substances causing the low-molecular weight compound to volatilize, it is an important factor suppressing the volatilization of the by-produced low-molecular weight compound to increase the purity of the polycarbonate resin itself as much as possible. To this effect, the purity can be increased by, for example, (1) reducing impurities of the starting materials to an absolute minimum as previously mentioned or (2) effecting the reaction with a minimum of by-products.

Along the latter direction, the organic phase and the aqueous phase are emulsified to increase the interface area beforehand, and then the emulsion is brought into contact with phosgene whereby phosgene is consumed to provide oligomers while minimizing dissolution of phosgene in the solvent. When a chain terminator is reacted on the oligomers thus formed, the resulting polycarbonate resin shows different heat stability from a polycarbonate resin produced without such emulsification, while there is no difference in the content of the low-molecular weight by-product. This difference is manifested as a phenomenon that the low-molecular weight compound hardly volatilizes when the polycarbonate resin is molded in high temperatures.

The reason the state of organic phase/aqueous phase contact has influences on the thermal behavior of the resulting polycarbonate resin seems to be as follows.

In cases where a terminator is used in the state of phenol in a stage where phosgene no more remains, a precursor from which a compound with its both ends terminated with the terminator is limited to a bischloroformate compound. The difference in the manner of preparing the bischloroformate compound is believed to govern the volatilization behavior during high temperature molding. That is, a bischloroformate compound prepared under the above-mentioned emulsified condition is thermally stable and can exist stably in the molten polycarbonate resin. On the other hand, a bischloroformate compound prepared without emulsification seems to undergo exchange reaction by phosgene dissolved in the reaction solvent (called phosgenolysis) and turns into a substance which is, while basically equal, is less stable to heat and liable to deterioration by heat. A compound with its both ends terminated derived from such a bischloroformate compound fails to exist stably in the molten polycarbonate resin and therefore volatilizes easily when exposed to high temperatures.

Similarly, compared with polycarbonate oligomers prepared by using phosgene as containing a trace amount of impurities, such as $Cl_2$, the polycarbonate oligomers prepared by using impurity-free phosgene are more stable thermally and less volatilizable.

That is, where the interfacial condensation process is carried out by (i) removing free chloride, which is a low-boiling impurity, from phosgene (i.e., to increase the purity of a starting material), (ii) emulsifying methylene chloride (organic phase) and an alkali metal salt of an aromatic diol (aqueous phase) (i.e., to increase the interface area of another starting material), and (iii) bringing the resulting emulsion into contact with the impurity-free phosgene, the oligomers formed on the interface are amply supplied with the aromatic diol alkali metal salt from the aqueous phase. Thus, the consumption of phosgene by reaction is accelerated, whereby the phosgene's opportunities to dissolve in the solvent are greatly reduced. As a result, formation of a monochloroformate compound takes place predominantly, while the bischloroformate compound rarely undergoes exchange reaction by phosgene, eventually providing thermally stable oligomers. Besides, since the starting phosgene contains substantially no impurities, such as $Cl_2$, the polymers and oligomers are prevented from being partially chlorinated and becoming thermally labile, and the low-molecular weight compound with its both ends terminated with the terminator also becomes thermally stable.

As stated above, where an interfacial condensation process is followed in the present invention, it is particularly preferable that the organic phase and the aqueous phase be brought into contact with each other into an emulsion prior to the contact with phosgene. Emulsifiers that are preferably used to prepare the emulsion include ordinary stirrers having stirring wings and, in addition, mixers, inclusive of dynamic mixers, such as a homogenizer, a homo-mixer, a colloid mill, a flow jet mixer, and an ultrasonic emulsifier, and static mixers. The emulsion usually has an emulsified droplet diameter of 0.01 to 10 $\mu$m and possesses emulsion stability.

The state of the emulsion is generally expressed in terms of a Weber number or P/q. A preferred Weber number is 10,000 or more, particularly 20,000 or more, especially 35,000 or more. A Weber number of about 1,000,000 can be seen as enough. A preferred P/q is 200 kg.m/λ or more, particularly 500 kg.m/λ or more, especially 1,000 kg./λ or more.

In order to inhibit dissolution of phosgene in the organic phase, the contact between the emulsion and phosgene is preferably performed under a milder condition than the emulsifying condition. That is, the state of the contact in terms of a Weber number is less than 10,000, preferably less than 5,000, still preferably less than 2,000; and, in terms of a P/q, less than 200 kg.m/λ, preferably less than 100 kg.m/λ, still preferably less than 50 kg.m/λ. The contact is effected by introducing phosgene into a pipe reactor or a tank reactor. The contact temperature is usually 80° C. or lower, preferably 70° C. or lower, still preferably 10 to 65° C.

Upon contact with phosgene, oligomerization proceeds. The concentration of the oligomers in the organic phase is not limited as long as the resulting oligomers are soluble, namely, about 10 to 40% by weight. The ratio of the organic phase to the aqueous phase, i.e., the aqueous solution of the aromatic diol alkali metal salt, is preferably 0.2 to 1.0 by volume. While not limiting, the oligomers obtained under these condensation conditions usually have a viscosity average molecular weight (Mv) of about 500 to 10,000, preferably 1,600 to 4,500.

The resulting oligomers are subjected to polycondensation in a conventional manner to obtain polycarbonate. In a preferred mode, the organic phase in which the oligomers are dissolved is separated from the aqueous phase. If necessary, the above-described inert inorganic solvent is added to the separated organic phase to adjust the concentration of the oligomers to 5 to 30% by weight. Then, an aqueous phase comprising water and an alkali metal hydroxide is added thereto to complete polycondensation to a prescribed degree in accordance with the interfacial condensation process. If desired, and preferably, the above-described condensation catalyst is added to the reaction system to optimize the polycondensation condition. The ratio of the organic phase to the aqueous phase in this stage is preferably about 1:0.2 to 1:1 by volume.

After completion of the polycondensation, the reaction mixture is washed with an alkali, such as sodium hydroxide, until the residual chloroformate group content decreases to 0.1 μeq/g or lower. Thereafter the organic phase is washed until any electrolyte disappears. The inert organic solvent is then removed from the organic phase by an appropriate means to isolate the polycarbonate resin. The polycarbonate resin thus obtained usually has a viscosity average molecular weight (Mv) of about 10,000 to 100,000.

The stage of adding the condensation catalyst or a branching agent, if used, is not particularly limited but is preferably during the period of from immediately after consumption of phosgene and by the time when chain extension begins.

The term "viscosity average molecular weight (Mv)" as used herein means a value calculated from the specific viscosity (ηsp) of a methylene chloride solution of oligomers or polycarbonate in a concentration (C) of 0.6 g/dλ measured at 20° C. according to the following equations:

$$\eta sp/C = [\eta](1+0.28\eta sp)$$

$$[\eta] = 1.23 \times 10^{-5} M v^{0.83}$$

If desired, effective amounts of various additives, such as stabilizers, release agents, flame retardants, antistatic agents, fillers, fibers, and impact modifiers, can be added to the polycarbonate resin when the resin is withdrawn from the reactor or before or during the processing of the resin.

The process for producing the polycarbonate resin of the present invention is not particularly limited. Those skilled in the art could easily carry out the production by following known processes while making preferred modifications. For example, it is preferred to introduce one or more of the above-described manipulations, such as reduction of a chlorine content of phosgene in using phosgene as a starting material, emulsification of an aqueous phase and an organic phase before contact with phosgene in following an interfacial condensation process, and addition of a monophenolic chain terminator during the period of from immediately after consumption of phosgene and by the time when chain extension begins. Some of these manipulations proposed for the production of the polycarbonate resin according to the present invention are known per se from the existing literature, but none of the processes specifically described in the literature fails to obtain the polycarbonate resin as specified in the present invention.

The polycarbonate resin according to the present invention can be processed by injection molding, extrusion molding or the like techniques into a variety of molded articles, such as film, fiber or plates. It is useful in various technical fields as, for example, electrical parts, constructional parts, lighting parts, and optical articles, particularly housings for lights, optical lenses, optical discs, and audio discs. It is especially suited in the optical field where high temperature molding in essentially involved.

Optical recording media according to the present invention generally comprise a disc substrate made of the polycarbonate resin according to the present invention, a recording layer made up of transition metal, e.g., Fe and Co, combined with rare earth elements, e.g., Tb, Gd, Nd, and Dy, which is formed by vacuum deposition or sputtering, an intermediate layer made of silicone ceramics, etc. which is provided to protect the recording layer, and an overcoat layer made of an ultraviolet-curing resin, etc. which is provided as a top layer. The optical recording media of this type include write-once and rewritable media.

As described above, the polycarbonate resin according to the present invention exhibits remarkably improved heat stability in high temperature molding as well as excellent physical properties inherent to polycarbonate resins, thereby providing molded articles free from coloration while suppressing volatilization of low-molecular weight compounds. Therefore, the polycarbonate resin of the present invention enjoys a broadened range of application as compared with conventional polycarbonate resins. In particular, when it is used as a substrate of optical recording media, there are provided optical recording media with excellent characteristics.

The present invention will now be illustrated in greater detail with reference to Examples, but it should be understood that the present invention is not construed as being limited thereto.

EXAMPLES 1 TO 5

An aqueous phase was prepared at 35° C. from 16.31 kg/hr of bisphenol A (hereinafter abbreviated an BPA), 5.93 kg/hr of sodium hydroxide, and 101.1 kg/hr of water in the presence of 0.018 kg/hr of hydrosulfite and cooled to 25° C. The aqueous phase and an organic phase cooled to 5° C. which consisted of 68.0 kg/hr of methylene-chloride were fed to a stainless steel-made pipe having an inner diameter of 6 mm and an outer diameter of 8 mm and mixed together there. The mixture was emulsified in a homo-mixer (T.K Homomic Line Flow LF-500, manufactured by Tokusyukika Kogyo K.K.) to prepare an emulsion comprising an aqueous solution of bisphenol A sodium (hereinafter abbreviated as BPA-Na) (aqueous phase) and methylene chloride (organic phase).

The emulsion was withdrawn from the homo-mixer through a pipe having an inner diameter of 6 mm and an outer diameter of 8 mm connected to the homo-mixer and led to a Teflon-made pipe reactor having an inner diameter of 6 mm and a length of 34 m, where the emulsion was brought into contact with 7.5 kg/hr of liquefied phosgene which was being supplied through a pipe cooled to 0° C. The liquefied phosgene used here had been passed through a cylinder of 55 mm in diameter and 500 mm in height packed with activated carbon having a particle size of about 30 to 60 mesh, a true density of 2.1 g/cc, a porosity of 40%, a specific surface area of 1200 m$^2$/g, and a total pore volume of 0.86 cc/g (Yashi Coal S, produced by Ohira Kagaku K.K.) at −5° C., a flow rate of 7.2 kg/hr, and a space velocity of 3 so as to reduce its chlorine content. The chlorine content of the phosgene before the adsorption treatment and that at the outlet of the cylinder are shown in Table 1.

The emulsion and phosgene were reacted and oligomerized while running through the pipe reactor at a linear speed of 1.7 m/sec for 20 seconds. The reaction temperature was met at 60° C., and the reaction mixture was externally cooled to 35° C. before entering the next oligomerization tank.

The oligomerized emulsion was led from the pipe reactor to a 50 λ-volume tank reactor equipped with a stirrer, where the emulsion was stirred at 30° C. in a nitrogen atmosphere to further oligomerize until the unreacted BPA-Na in the aqueous phase was completely consumed. During the oligomerization, 0.005 kg/hr of triethylamine as a catalyst and 0.65 kg/hr of p-t-butylphenol an a molecular weight modifier were introduced into the reactor occasionally. After completion of the oligomerization, the system was allowed to stand still and separate into two phases, and the methylene chloride solution of the oligomers was obtained.

A 23 kg portion of the resulting methylene chloride solution of the oligomers was put into a 70 λ-volume tank reactor equipped with a Faudler wing. In the reactor were further placed 10 kg of methylene chloride for dilution, 2.2 kg of a 25 wt % sodium hydroxide aqueous solution, 6 kg of water, and 2.2 g of triethylamine. The mixture was stirred at 30° C. in a nitrogen atmosphere for 60 minutes to conduct polycondesation.

To the reaction mixture were added 30 kg of methylene chloride and 7 kg of water, followed by stirring for 20 minutes. The stirring was stopped to separate the mixture into an aqueous phase and an organic phase. To the separated organic phase was added 20 kg of 0.1N hydrochloric acid, followed by stirring for 15 minutes to extract triethylamine and a slight amount of the residual alkali component. The stirring was stopped to separate the mixture into an aqueous phase and an organic phase. To the separated organic phase was added 20 kg of pure water, followed by stirring for 15 minutes. The stirring was ceased to separate the mixture into an aqueous phase and an organic phase. These operations were repeated until no chloride ion was detected from the aqueous phase (3 times).

The resulting purified polycarbonate solution was powdered in a kneader and dried to obtain flakes. The flakes were kneaded in a twin-screw extruder having a diameter of 30 mm (manufactured by Ikegai Corporation) at a resin temperature of 290° C. in a nitrogen atmosphere and pelletized at a rate of 15 kg/hr. The powdering and pelletization of the polycarbonate resin were carried out with due care taking into consideration the possibilities of contamination with impurities originated in workers' hands, sweat or cooling water.

Physical properties and molding properties of the resulting polycarbonate resin were measured or evaluated in accordance with the following methods. The results obtained are shown in Table 1.

(1) Molecular Weight Distribution (Mw/Mn)

A gel-permeation chromatograph (HLC-8020, manufactured by Tosoh Corp.) was used. A tetrahydrofuran solution of the resin was passed through 4 columns packed with respective fillers for high speed liquid chromatography (TSK 5000HLX, 4000HLX, 3000HLX, and 2000HLX, all produced by Tosoh Corp.). The fractions were analyzed to prepare a chart from the difference in refractive indices, from which the weight average molecular weight (Mw) and the number average molecular weight (Mn) were obtained on polystyrene conversion to calculate Mw/Mn.

(2) Color Tone (YI)

An injection molding machine (FS80S-12ASE, manufactured by Nissei Jushi Kogyo K.K.) was used. The flakes were plasticized at 280° C., retained in the cylinder for 5 minutes or 15 seconds, and injection molded to obtain a 60 mm-square specimen having a thickness of 3.2 mm. The yellowness index (YI) of the specimens were measured with a color difference meter (SM-4-CH, manufactured by Suga Shikenki K.K.). A small YI value of the 15-second retention specimen indicates a satisfactory color tone in ordinary molding. A small YI difference (ΔYI) between the 15-second retention specimen and the 5-minute retention specimen shows satisfactory heat stability in high temperatures.

(3) Amounts of Decomposition Products and Vaporized Compounds

The pellets weighing 20 g were sealed into a glass tube in vacuo (1 mmHg). The lower part of the glass tube where the pellets were heated at 350° C. for 20 minutes (Condition A) or 400° C. for 30 minutes (Condition B). The substance which deposited on the air-cooled gaseous phase part of the glass tube (50 to 150° C.) was dissolved in tetrahydrofuran (THF), and the solution was subjected to liquid chromatography (liquid chromatograph; Shimadzu LC-9A; eluent: THF/water=1/1↓100% THF; detecting wavelength: UV 270 nm). The thus developed compounds were identified by an LC-MS method.

Of the identified compounds, the amounts of PBP, a compound represented by formula (III) (hereinafter referred to as C-PTBP) and a compound represented by formula (IV) (hereinafter referred to as PB) were determined.

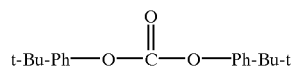

(III)

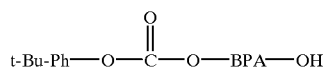

(IV)

wherein t—Bu is a tertiary butyl group; —Ph— is a phenylene group; and O—BPA—O is a bisphenol A residue.

(4) Amount of Low-molecular Weight Compound Adhered to Stamper in Disc Making

The resin pellets were injection molded to obtain 3.5-in. disc substrates by means of a molding machine (DISK3, manufactured by Sumitomo Heavy Industries, Ltd.) under the following conditions using a stamper 230MB (ISO/IEC 13963 standard).

Molding Conditions:
  Cylinder temperature: 350° C.
  Mold temperature: 103° C./98° C.
  Loading time: 0.34 sec
  Cooling time: 4.5 sec
  Compressive force: 22.5–13.8–10 ton
  Number of shots: 5000 (10 g-resin/shot)

After making 5000 shots, the substance adhered to the stamper was dissolved in THF and analyzed by liquid chromatography in the same manner as in (3) above. Because the adhered substance was found consisting mainly of PBP, the PBP concentration of the THF solution was obtained by an absolute calibration curve method. The concentration was converted into the weight of sublimed PBP per the total amount of the resin injected.

The same test was repeated except for changing the cylinder temperature to 380° C.

(5) Injection Molding Properties and Substrate Characteristics

Pit deviation was judged every three disc substrates per 1000 shots by observing Inner Test Zone for Manufacturers, Outer Test Zone for Manufacturers and Data Zone of Bands 7 to 9 (ISO/IEC 13963 standard) under an optical microscope. Mold release unevenness was evaluated every 25 disc substrates per 1000 shots by observing with reflected light and transmitted light with the naked eye.

Further, the in-plane birefringence and vertical birefringence were measured with an automatic double refraction meter (ADR-130N, manufactured by Oak Seisakusho) to obtain the minimum and the maximum.

The mechanical properties of the substrate were evaluated in accordance with the ISO/IEC 13963 standard for optical discs. A substrate that exceeded the standard by a great deal was graded "A", and a substrate that barely met the standard was graded "B".

COMPARATIVE EXAMPLE 1

The procedure of Example 5 was repeated, except that the phosgene had not been treated with activated carbon.

COMPARATIVE EXAMPLE 2

The procedure of Example 5 was repeated, except that the aqueous phase consisting of bisphenol A, sodium hydroxide, and water and the organic phase of methylene chloride were mixed by passing through orifices of 2 mm in inner diameter instead of using a homo-mixer and then brought into contact with phosgene.

COMPARATIVE EXAMPLE 3

The procedure of Comparative Example 2 was repeated, except that the p-t-butylphenol as a molecular weight modifier was added simultaneously with phosgene supply.

COMPARATIVE EXAMPLE 4

The procedure of Comparative Example 2 was repeated, except that the p-t-butylphenol as a molecular weight modifier was added in the later stage of the condensation. That is, a 23 kg portion of the methylene chloride solution of the oligomers was put into a 70 λ-volume tank reactor equipped with a Faudler wing. In the reactor were further placed 10 kg of methylene chloride for dilution, 2.2 kg of a 25 wt % sodium hydroxide aqueous solution, 6 kg of water, and 2.2 g of triethylamine. The mixture was stirred at 30° C. in a nitrogen atmosphere for 15 minutes to conduct polycondensation. Then, p-t-butylphenol was added to the reaction mixture, and the stirring was further continued for 15 minutes to obtain polycarbonate.

COMPARATIVE EXAMPLE 5

A powdered polycarbonate resin was prepared in the same manner as in Comparative Example 2. A 5 kg portion of the polycarbonate powder was put into a 70 λ-volume reactor equipped with a Faudler wing, and 20 λ of acetone was added thereto. The mixture was stirred at 30° C. in a nitrogen atmosphere for 1 hour. The resin powder was separated from acetone by sieving through a metal net of 48 mesh and dried.

COMPARATIVE EXAMPLE 6

The procedure of Example 5 was repeated, except for using phosgene having a high chlorine content and passing the phosgene through the column of activated carbon at a space velocity of 20.

The polycarbonate resins prepared in Comparative Examples 1 to 6 were evaluated in the same manner as in Examples 1 to 5. The results obtained are shown in Table 2.

TABLE 1

| | | Example No. | | | | |
|---|---|---|---|---|---|---|
| | | 1 | 2 | 3 | 4 | 5 |
| Weber Number ($\times 10^3$) of BPA Aqueous Solution/$CH_2Cl_2$ Emulsion | | 23 | 37 | 49 | 59 | 59 |
| $Cl_2$ Content in Phosgene (ppb) | Before Treatment | 2000 | 2000 | 2000 | 2000 | 2000 |
| | After Treatment | ND*1 | ND | ND | ND | ND |
| Mv of Produced Polymer | | 15000 | 15200 | 15100 | 14900 | 15300 |
| Mw/Mn | | 2.67 | 2.70 | 2.68 | 2.70 | 2.72 |
| YI: 15-sec Retention | | 0.7 | 0.6 | 0.6 | 0.5 | 0.4 |
| YI: 5-min Retention | | 1.6 | 1.5 | 1.5 | 1.4 | 1.4 |
| ΔYI | | 0.9 | 0.9 | 0.9 | 0.9 | 1.0 |
| Low-molecular Weight Compounds in | PBP | 4000 | 3900 | 3800 | 3600 | 3500 |
| | C-PTBP | ND | ND | ND | ND | ND |
| | PB | ND | ND | ND | ND | ND |

TABLE 1-continued

|  |  | Example No. | | | | |
|---|---|---|---|---|---|---|
|  |  | 1 | 2 | 3 | 4 | 5 |
| Resin as Produced (ppm*[2]) | | | | | | |
| Vaporized Low-mol. Compounds under Condition A*[3] (ppm*[2]) | PBP | 7 | 7 | 6 | 5 | 5 |
| | C-PTBP | 0 | 0 | 0 | 0 | 0 |
| | PB | 0 | 0 | 0 | 0 | 0 |
| Vaporized PBP Amount under Condition A/PBP Amount (%) | | 0.18 | 0.18 | 0.16 | 0.14 | 0.14 |
| Vaporized Low-mol. Compounds under Condition B*[4] (ppm*[2]) | PBP | 40 | 38 | 36 | 35 | 32 |
| | C-PTBP | 100 | 102 | 101 | 105 | 100 |
| | PB | 40 | 45 | 40 | 42 | 44 |
| Vaporized PBP Amount under Condition B/PBP Amount (%) | | 1.0 | 0.97 | 0.95 | 0.97 | 0.91 |
| PBP Adhered to Stamper: 350° C. (ppb*[5]) | | 0.9 | 0.9 | 0.9 | 0.9 | 0.8 |
| PBP Adhered to Stamper: 380° C. (ppb*[5]) | | 3.2 | 3.1 | 3.2 | 3.3 | 3.0 |
| Molding Defects | Pit Deviation | none | none | none | none | none |
| | Mold Release Unevenness | none | none | none | none | none |
| Substrate Characteristics | In-plane Birefringence ($\times 10^{-6}$): Min–Max | 0–6 | 0–6 | 0–6 | 0–6 | 0–7 |
| | Vertical Birefringence ($\times 10^{-6}$); Min–Max | 450–480 | 460–480 | 450–480 | 450–480 | 460–490 |
| | Mechanical Properties | A | A | A | A | A |

TABLE 2

|  |  | Comparative Example No. | | | | | |
|---|---|---|---|---|---|---|---|
|  |  | 1 | 2 | 3 | 4 | 5 | 6 |
| Weber Number ($\times 10^3$) of BPA Aqueous Solution/CH$_2$Cl$_2$ Emulsion | | 59 | | | | | 59 |
| Cl$_2$ Content in Phosgene (ppb) | Before Treatment | — | 2000 | 2000 | 2000 | 2000 | 5000 |
| | After Treatment | 2000 | ND | ND | ND | ND | 1800 |
| Mv of Produced Polymer | | 15000 | 15000 | 15000 | 21000 | 15000 | 15000 |
| Mw/Mn | | 2.80 | 2.80 | 2.80 | 3.10 | 2.48 | 2.79 |
| YI: 15-sec Retention | | 2.0 | 1.8 | 1.5 | 1.3 | 1.9 | 1.3 |
| YI: 5-min Retention | | 4.0 | 3.4 | 3.0 | 2.8 | 3.9 | 2.5 |
| ΔYI | | 2.0 | 1.6 | 1.5 | 1.5 | 2.0 | 1.2 |
| Low-molecular Weight Compounds in Resin as Produced (ppm*[2]) | PBP | 4200 | 3600 | 2200 | 500 | 550 | 4300 |
| | C-PTBP | ND | ND | 1500 | ND | ND | ND |
| | PB | ND | ND | ND | ND | ND | ND |
| Vaporized Compounds under Condition A*[3] (ppm*[2]) | PBP | 11 | 10 | 6 | 4 | 2 | 11 |
| | C-PTBP | 0 | 0 | 60 | 0 | 0 | 0 |
| | PB | 0 | 0 | 0 | 0 | 0 | 0 |
| Vaporized PBP Amount under Condition A/PBP Amount (%) | | 0.26 | 0.28 | 0.27 | 0.8 | 0.36 | 0.26 |
| Vaporized Compounds under Condition B*[4] (ppm*[2]) | PBP | 95 | 85 | 45 | 15 | 15 | 90 |
| | C-PTBP | 95 | 100 | 560 | 70 | 65 | 95 |
| | PB | 40 | 45 | 45 | 25 | 30 | 40 |
| Vaporized PBP Amount under Condition B/PBP Amount (%) | | 2.27 | 2.36 | 2.04 | 3.0 | 2.73 | 2.09 |
| PBP Adhered to Stamper: 350° C. (ppb*[5]) | | 3.5 | — | 2.2 | — | 0.9 | — |
| PBP Adhered to Stamper: 380° C. (ppb*[5]) | | 9.5 | — | 5.4 | — | 3.1 | — |
| Molding Defects | Pit Deviation | observed | | observed | | not observed | |
| | Mold Release Unevenness | observed on outer periphery | | observed on outer periphery | | initially developed | |

TABLE 2-continued

|  |  | Comparative Example No. | | | | | |
|---|---|---|---|---|---|---|---|
|  |  | 1 | 2 | 3 | 4 | 5 | 6 |
| Substrate Characteristics | In-plane Birefringence (× 10⁻⁶): Min~Max | −2~6 |  | 0~8 |  | −4~8 |  |
|  | Vertical Birefringence (× 10⁶); Min~Max | 430–490 |  | 465–495 |  | 460–520 |  |
|  | Mechanical Properties | B |  | A |  | A |  |

Note:
*¹Not detected.
*²Based on polycarbonate resin.
*³350° C. × 20 mins.
*⁴400° C. × 30 mins.
*⁵Based on total polycarbonate resin injected.

While the invention has been described in detail and with reference to specific examples thereof, it will be apparent to one skilled in the art that various changes and modifications can be made therein without departing from the spirit and scope thereof.

What is claimed is:

1. A polycarbonate resin obtained by polymerizing an aromatic diol and a carbonate-forming compound using a monophenolic compound as a molecular weight modifier, wherein said polycarbonate resin contains from 0.2 to 2% by weight of a low-molecular weight compound represented by formula (I):

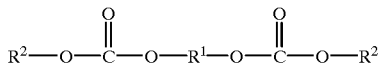

(I)

wherein $R^1$ represents an aromatic diol residue; and $R^2$ represents a monophenolic compound residue, and when said polycarbonate resin is heated at 350° C. under reduced pressure of 1 mmHg for 20 minutes, the amount of the low-molecular weight compound of formula (I) which volatilizes is not more than 0.2% by weight based on the weight of said low-molecular weight compound of formula (I) present in the polycarbonate resin.

2. The polycarbonate resin according to claim 1, wherein said carbonate-forming compound is phosgene having a chlorine content of not more than 1500 ppb or a carbonate compound prepared from said phosgene.

3. The polycarbonate resin according to claim 2, wherein said phosgene has a chlorine content of not more than 1000 ppb.

4. The polycarbonate resin according to claim 1, wherein said polycarbonate resin is obtained by a process comprising the steps of:

contacting an organic phase containing an organic solvent with an aqueous phase containing water and a metal salt of aromatic diol under an emulsifying conditions to form an emulsion, and contacting the emulsion with phosgene as a carbonate-forming compound under condensation reaction conditions and under a mixing conditions milder than said emulsifying conditions to form oligomers.

5. The polycarbonate resin according to claim 2, wherein said polycarbonate resin is obtained by a process comprising the steps of:

contacting an organic phase containing an organic solvent with an aqueous phase containing water and a metal salt of aromatic diol under an emulsifying conditions to form an emulsion, and contacting the emulsion with phosgene as a carbonate-forming compound under a condensation reaction conditions and under a mixing conditions milder than said emulsifying conditions to form oligomers.

6. A polycarbonate resin obtained by polymerizing an aromatic diol and a carbonate-forming compound using a monophenolic compound as a molecular weight modifier, wherein said polycarbonate resin contains from 0.2 to 2% by weight of a low-molecular weight compound represented by formula (I):

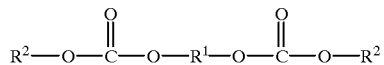

(I)

wherein $R^1$ represents an aromatic diol residue; and $R^2$ represents a monophenolic compound residue, and when said polycarbonate resin is heated at 400° C. under reduced pressure of 1 mmHg for 30 minutes, the amount of the low-molecular weight compound of formula (I) which volatilizes is not more than 2% by weight based on the weight of said low-molecular weight compound of formula (I) present in the polycarbonate resin.

7. The polycarbonate resin according to claim 6, wherein said carbonate-forming compound is phosgene having a chlorine content of not more than 1500 ppb or a carbonate compound prepared from said phosgene.

8. The polycarbonate resin according to claim 7, wherein said phosgene has a chlorine content of not more than 1000 ppb.

9. The polycarbonate resin according to claim 6, wherein said polycarbonate resin is obtained by a process comprising the steps of:

contacting an organic phase containing an organic solvent with an aqueous phase containing water and a metal salt of aromatic diol under an emulsifying conditions to form an emulsion, and contacting the emulsion with phosgene as a carbonate-forming compound under condensation reaction conditions and under a mixing conditions milder than said emulsifying conditions to form oligomers.

10. The polycarbonate resin according to claim 7, wherein said polycarbonate resin is obtained by a process comprising the steps of:

contacting an organic phase containing an organic solvent with an aqueous phase containing water and a metal salt of aromatic diol under an emulsifying conditions to form an emulsion, and contacting the emulsion with phosgene as a carbonate-forming compound under a condensation reaction condition and under mixing conditions milder than said emulsifying conditions to form oligomers.

11. A polycarbonate resin obtained by polymerizing an aromatic diol and a carbonate-forming compound using a monophenolic compound as a molecular weight modifier, wherein said polycarbonate resin contains from 0.2 to 2% by weight of a low-molecular weight compound represented by formula (I):

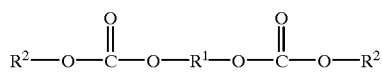
(I)

wherein $R^1$ represents an aromatic diol residue; and $R^2$ represents a monophenolic compound residue, and after 5000 injection shots of said polycarbonate resin each weighing 10 g are made into discs at a cylinder temperature of 350° C., the amount of the low-molecular weight compound of formula (I) which adheres to the stamper is not more than 1 ppb based on the total weight of the injected resin.

12. The polycarbonate resin according to claim 11, wherein said carbonate-forming compound is phosgene having a chlorine content of not more than 1500 ppb or a carbonate compound prepared from said phosgene.

13. The polycarbonate resin according to claim 11, wherein said polycarbonate resin is obtained by a process comprising the steps of:

contacting an organic phase containing an organic solvent with an aqueous phase containing water and a metal salt of aromatic diol under an emulsifying conditions to form an emulsion, and contacting the emulsion with phosgene as a carbonate-forming compound under condensation reaction conditions and under mixing conditions milder than said emulsifying conditions to form oligomers.

14. A polycarbonate resin obtained by polymerizing an aromatic diol and a carbonate-forming compound using a monophenolic compound as a molecular weight modifier, wherein said polycarbonate resin contains from 0.2 to 2% by weight of a low-molecular weight compound represented by formula (I):

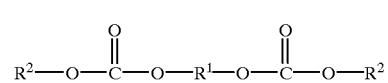
(I)

wherein $R^1$ represents an aromatic diol residue; and $R^2$ represents a monophenolic compound residue, and after 5000 injection shots of said polycarbonate resin each weighing 10 g are made into discs at a cylinder temperature of 380° C., the amount of the low-molecular weight compound of formula (I) which adheres to the stamper is not more than 4 ppb based on the total weight of the injected resin.

15. The polycarbonate resin according to claim 14, wherein said carbonate-forming compound is phosgene having a chlorine content of not more than 1500 ppb or a carbonate compound prepared from said phosgene.

16. The polycarbonate resin according to claim 14, wherein said polycarbonate resin is obtained by a process comprising the steps of:

contacting an organic phase containing an organic solvent with an aqueous phase containing water and a metal salt of aromatic diol under an emulsifying conditions to form an emulsion, and contacting the emulsion with phosgene as a carbonate-forming compound under condensation reaction conditions and under mixing conditions milder than said emulsifying conditions to form oligomers.

17. A substrate for an optical recording medium which comprises the polycarbonate resin according to claim 1.

18. An optical recording medium comprising a substrate having provided thereon an optical recording layer, wherein said substrate comprises the polycarbonate resin according to claim 1.

19. A substrate for an optical recording medium which comprises the polycarbonate resin according to claim 6.

20. An optical recording medium comprising a substrate having provided thereon an optical recording layer, wherein said substrate comprises the polycarbonate resin according to claim 6.

* * * * *